(12) United States Patent
Stenton

(10) Patent No.: US 6,480,284 B1
(45) Date of Patent: Nov. 12, 2002

(54) MULTIPLE PLANE REFERENCE MIRROR FOR INTERFEROMETRIC TESTING OF OPTICAL SYSTEMS

(75) Inventor: Conrad Stenton, Midland (CA)

(73) Assignee: Raytheon Company, Lexington, MA (US)

( * ) Notice: Subject to any disclaimer, the term of this patent is extended or adjusted under 35 U.S.C. 154(b) by 166 days.

(21) Appl. No.: 09/621,403

(22) Filed: Jul. 21, 2000

(51) Int. Cl.$^7$ .............................................. G01B 9/021
(52) U.S. Cl. ...................................... 356/458; 356/515
(58) Field of Search ........................... 356/239.1, 239.2, 356/903, 124, 512, 513, 514, 515, 458, 521; 359/15, 584, 589, 838, 850

(56) References Cited

U.S. PATENT DOCUMENTS 5,815,268 A * 9/1998 LaFleur ...................... 356/515

* cited by examiner

Primary Examiner—Samuel A. Turner
Assistant Examiner—Patrick J Connolly
(74) Attorney, Agent, or Firm—William C. Schubert; Glenn H. Lenzen, Jr.

(57) ABSTRACT

An interferometric testing system for testing an optical system includes an interferometer which outputs a light beam and analyzes the returned light beam, and a multiple plane reference mirror which reflects the light beam corresponding to the image point transmitted by the optical system back through the optical system to thereby generate the interference. According to one aspect of the invention, the multiple plane reference mirror reflects the light beam back along the arrival path of the light beam. According to another aspect of the invention, the multiple plane reference mirror comprises a holographic multiple plane reference mirror. The interferometric testing method is also described.

8 Claims, 3 Drawing Sheets

MULTIPLE PLANE REFERENCE MIRROR FOR INTERFEROMETRIC TESTING OF OPTICAL SYSTEMS

BACKGROUND OF THE INVENTION

1. Field of the Invention

The present invention relates to optical systems. More specifically, the present invention relates to systems and methods for interferometric testing of optical systems.

2. Description of the Related Art

The precision to which an optical surface can be fabricated is largely driven by how precisely it can be tested. The advent of the laser and phase-measuring interferometry has given fabricators powerful tools to measure, for example, optical surfaces to within a few nanometers departure from the theoretically perfect optical surface. Although the use of interferometry has made the testing of flats and spherical surfaces relatively simple, interferometric testing of optical systems, i.e., end-to-end testing of optical systems, represents a problem of increased complexity. For example, interferometric testing of optical systems is usually performed from the object side of the optical system to the image side. To achieve end-to-end testing, a retro-reflective ball is typically placed in the image plane so that the light traversing the optical system under test is reflected from the surface of the ball and returns to the interferometer. In many cases, it would be desirable to test the optical system from the image side rather than the object side.

It will be noted that the testing of an optical system does not rely on the results of a single test performed with respect to a single image point. Optical system testing necessitates testing with respect to a number of image points. There are generally two techniques for generating these image points. The first is to physically lock the interferometer and optical device generating the point with respect to one another and then to move the interferometer-optical device combination to a series of predetermined locations relative to the optical system under test. One major drawback with this technique is that the retro-reflector on the object side of the optical system under test must be realigned, at least in tip and tilt, for each predetermined location in the test sequence. Alternatively, an array of lenses can be employed to generate a plurality of points. One major problem with the latter technique is that the plurality of lenses needed to generate the multiple point sources physically interfere with one another, e.g., overlap, in fast systems.

What is needed is a system which facilitates testing of an optical system from the image side. More specifically, what is needed is a plane reflector capable of retro-reflecting multiple point sources of light to facilitate multipath testing of an optical system using an interferometer disposed in image space. Most specifically, what is needed is a multiple plane reference mirror for reflecting multiple point sources back along the angle of incidence for testing of the optical system using an interferometer located in image space. Ideally, the multiple plane reference mirror would be a thin, unitary structure, which would permit optimization of the interferometric testing system with respect to, for example, size and weight.

SUMMARY OF THE INVENTION

The need in the art is addressed by a multiple plane reference mirror for an interferometric testing system and a corresponding method for operating such as system. The interferometric testing system including the multiple plane reference mirror of the present invention advantageously provides an interferometric testing system which minimizes the need for system realignment between testing events with respect to individual point sources generated by repositioning the interferometer with respect to the optical system under test. The need in the art is also addressed by a method of testing an optical system using the multiple plane reference mirror.

Preferably, an interferometric system for testing an optical system includes an interferometer which outputs a light beam and analyzes the returned light beam, a lens which forms a perfect point in an image plane of the optical system responsive to the light beam, and a multiple plane reference mirror which reflects the light beam corresponding to the image point transmitted by the optical system back through the optical system into the interferometer for analysis. According to another aspect of the invention, the multiple plane reference mirror comprises a holographic multiple plane reference mirror.

Alternatively, the interferometric testing system for testing an optical system according to the present invention includes a first device for outputting a light beam, a second device for analyzing a selected light beam, a third device for generating an image point in an image plane of the optical system responsive to the light beam, and a fourth device for reflecting the light beam corresponding to the image point transmitted by the optical system back through the optical system to thereby generate the selected light beam. Advantageously, the fourth device reflects the light beam back along the arrival path of the light beam. Preferably, the fourth device is a multiple plane reference mirror and, most preferably, the multiple plane reference mirror is a holographic multiple plane reference mirror.

The above-mentioned interferometric testing system including a multiple plane reference mirror can be operated to thereby evaluate an optical system under test by steps for generating an image point at a selected one of N predetermined test points, passing light corresponding to the image point from the image side of the optical system under test to the object side, reflecting light corresponding to the image point from the object side of the optical system under test to the image side, collecting data corresponding to the reflected light, repeating the generating, passing, reflecting, and collecting steps for each of the N predetermined test points, and analyzing the collected data for all of the N predetermined test points.

DESCRIPTION OF THE INVENTION

Illustrative embodiments and exemplary applications will now be described with reference to the accompanying drawing to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In order to fully evaluate the performance of an optical system under test, end-to-end testing would require that both the interferometer 12 and the reference sphere 16 be moved to various image points corresponding to various off-axis positions so that the performance of the optical system can be evaluated with respect to various object positions. Thus, the point source generated by the interferometer-reference sphere combination would have to be positioned to a plurality of predetermined test points around the axis of the optical system, e.g., the axis of the lens under test 26. Alternatively, the optical system under test could be moved with respect to a fixed interferometer 12 position. A retro reflector of some description to permit the light transmitted through the system under test to be reflected back though the system and then to the interferometer. In short, either the system under test would remain stationary and all components of the test system would move relative to the system under test or the system under test would move relative to the point source. In either case, the postulated test system simply requires too many moving parts. Thus, a robust test system for end-to-end testing of optical system cannot be achieved.

The interferometric testing system employing a multiple plane reference mirror according to the present invention advantageously is capable of end-to-end testing of a multi-component optical system while employing a relatively compact and robust structure. Moreover, the optical test system employing the multiple plane reference mirror according to the present invention evaluates the system under test from the image side of the system under test instead of the object side.

In other words, the interferometer-reference sphere combination advantageously can be displaced relative to the optical system under test between a number of predetermined test locations, and the system performance of the optical system under test can be evaluated without requiring realignment of the retro-reflector after repositioning the interferometer-reference-sphere combination relative to the optical system under test. A multiple plane reference mirror according to the present invention disposed at the appropriate angle returns the light to the optical system under test and back to the interferometer for analysis.

Figure 1:
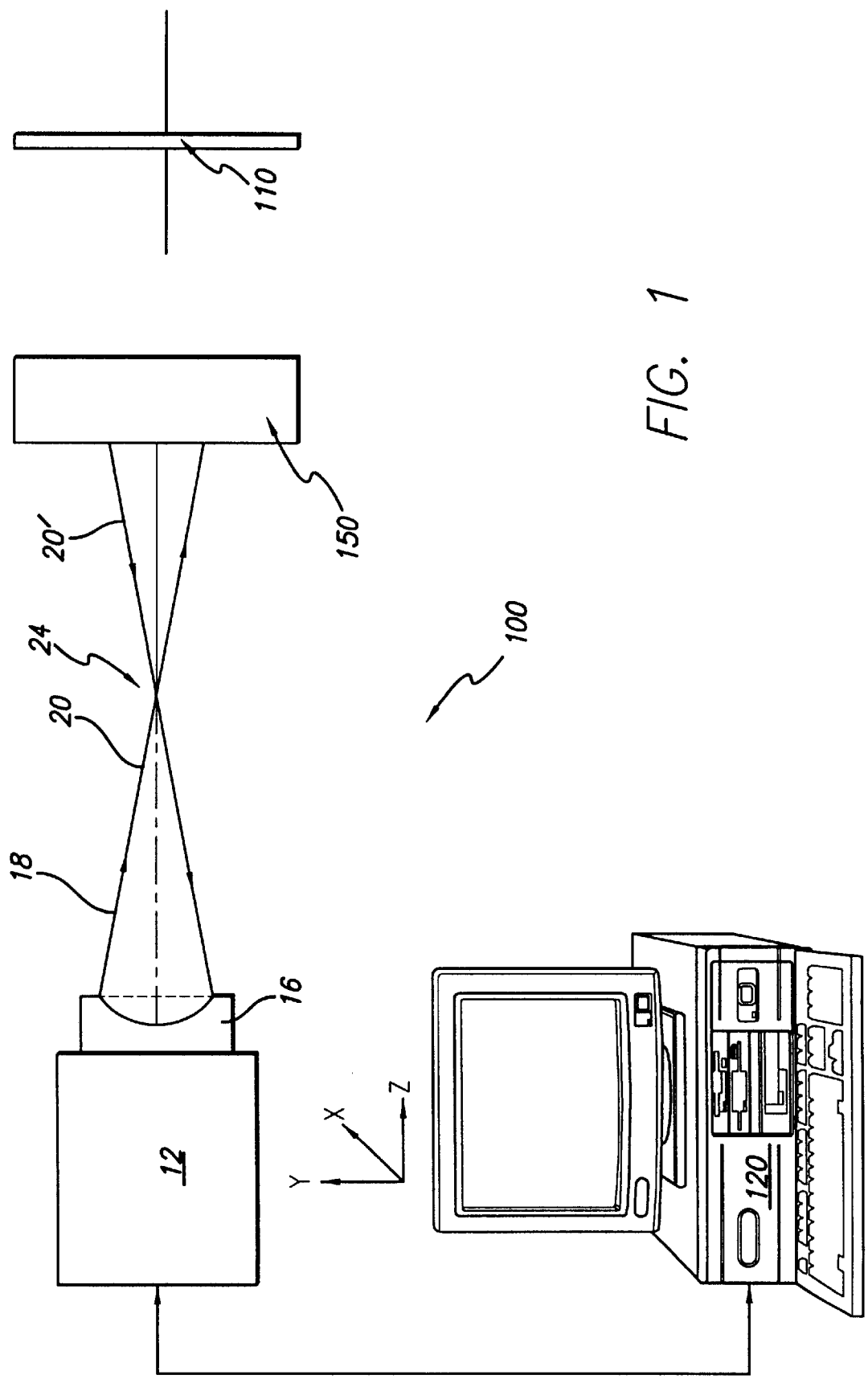
FIG. 1 is a schematic diagram of an interferometric testing system which includes a multiple plane reference mirror according to the present invention.

FIG. 1 is a schematic diagram of an interferometric testing system 100 which includes a multiple plane reference mirror 110 employed in the evaluation an optical system under test 150 according to one preferred embodiment of the present invention. A detailed discussion of the elements 12, 16, and 22 and the various beams, e.g., beam 18, will be omitted since these elements are substantially similar to like numbered elements discussed with respect to FIG. 1. It will be appreciated that a computer 120 advantageously can be employed to store and analyze data collected using the interferometer 12.

In the optical test system 100, the interferometer 12 is depicted as positioned to illuminate the on-axis position of the optical system under test 150. In turn, the optical system under test 150 generates a beam that is output on the object side of the optical system under test, which strikes the multiple plane reference mirror 110 and is reflected back along the axis of the optical system under test 150 toward the interferometer 12.

Figure 2A:
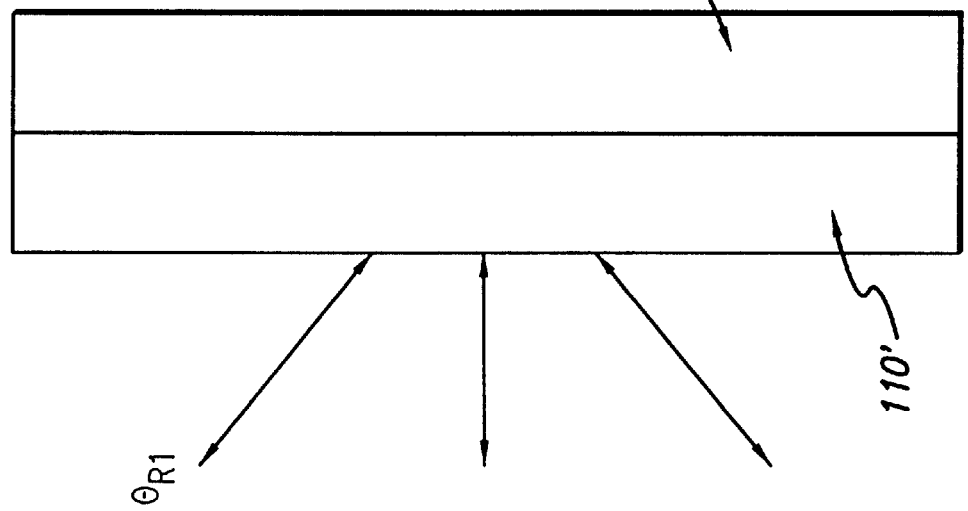
FIG. 2A illustrates a conventional retro-reflector.
Figure 2B:
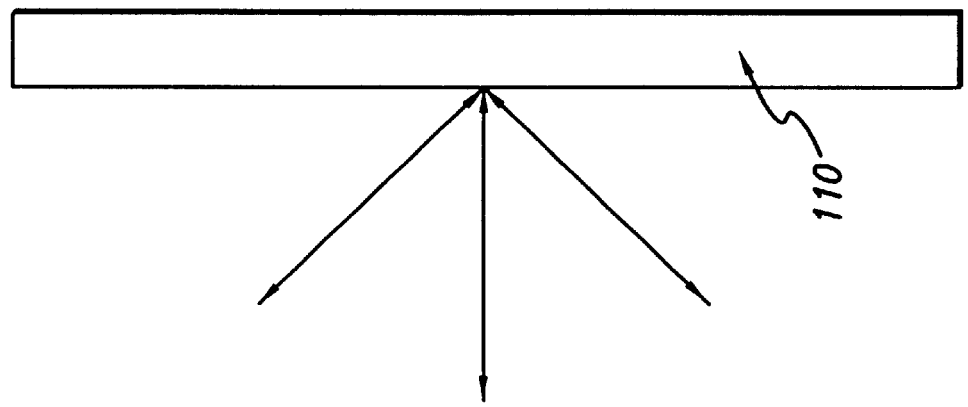
FIG. 2B illustrates a multiple plane reference mirror employed in the interferometric testing system depicted in FIG. 1.

FIGS. 2A and 2B illustrate alternative retro-reflectors, i.e., a conventional retro-reflector 40 and a multiple plane reference mirror 110, respectively. When the retro-reflector 40 is installed in an optical test system, such as the system illustrated in FIG. 1, the spherical wave 18 proceeds through the optical system under test 150 (emerging as a plane wave with errors), strikes the plane retro-reflector 40, and returns back through the optical system under test and into the interferometer 12 for analysis. Once the axial measurement has been completed, the interferometer is repositioned to one of a predetermined number of off-axial field or test points, where another measurement can be performed. It will be appreciated that the planar retro-reflector 40 of FIG. 2A must be rotated by respective angles θ and φ about the X and Y axes for each of the test points. It will also be appreciated that the values of θ and φ are determined with respect to the angle of the incident light striking the retro-reflector 40 from the optical system under test 150. This procedure, i.e., repositioning the interferometer and realigning the retro-reflector 40, is then repeated for all of the predetermined test points. Given the X, Y, and Z-axis positions of the test points and the values of θ and φ, one of ordinary skill in the art can obtain meaningful distortion measurements and wavefront information of the optical system under test 150.

It will be noted that an interferometric testing system employing the conventional retro-reflector 40 must be large enough to accommodate the mechanisms which are required to permit the rotation of the retro-reflector 40 in tip and tilt. Moreover, one of ordinary skill in the art will recognize that the testing of the optical system under test requires both precise alignment of the interferometer 12 with respect to the optical system under test 150 and precise alignment of the retro-reflector 40 with respect to the respective point source in the image plane produced by light from the interferometer 12. Thus, the measurement process takes approximately twice as long as it would be if one of the alignment steps could be eliminated.

According to the present invention, in the interferometric testing system 100 illustrated in FIG. 1, the plane retro-reflector 40 illustrated in FIG. 2A is replaced by the multiple plane reference mirror 110 illustrated in FIG. 2B. The multiple plane reference mirror 110 advantageously is a retro-reflector that returns an incident beam of light arriving at the multiple plane reference mirror 110 at a predetermined angle determined by the optical system under test 150 and the image points tested, e.g., back on itself.

Figure 2C:
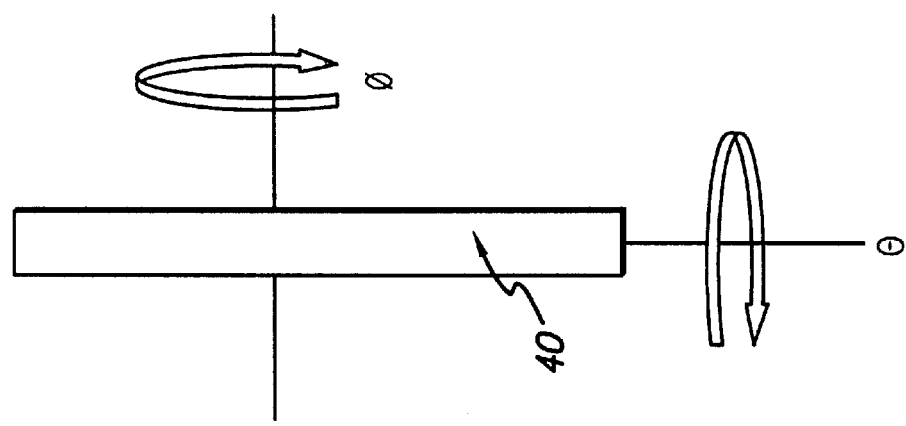
FIG. 2C is a diagram useful in understanding the of the multiple plane reference mirror.

The multiple plane reference mirror 110 may best be understood by considering the following. Suppose that the multiple plane reference mirror consists of two separate parts, a grating 110' and a mirror 110" as depicted in FIG. 2C. In a first case, light striking the multiple plane reference mirror 110 at an angle of 0° will be returned at an angle of 0°. Moreover, the construction, e.g., the grating frequency, of the multiple plane reference mirror is such that light incident to the virtual grating 110' of the multiple plane reference mirror 110 at $\theta_{R1}$ is reflected back toward, in the exemplary case under discussion, the optical system under test at an angle of $\theta_{R1}$.

It will be appreciated that one can conceptualize the multiple plane reference mirror 110 discussed immediately above as a hologram of a mirror. It will also be appreciated that since a hologram advantageously can contain many images, one holographic multiple plane reference mirror can contain reflectors positioned at the required retro-angles for the test point sequence employed by the interferometric testing system 100. The construction of holographic mirrors for other purposes is well known as evidenced by U.S. Pat. Nos. 5,274,479 and 5,285,314, both of which patents are incorporated herein by reference for all purposes.

Advantageously, the holographic multiple plane reference mirror will return any incident beam back on itself only if it is at the correct incident angle. When the angle is wrong, tilt fringes result; this allows the interferometer 12 to perform distortion measurements based on tilt fringes.

Figure 3:
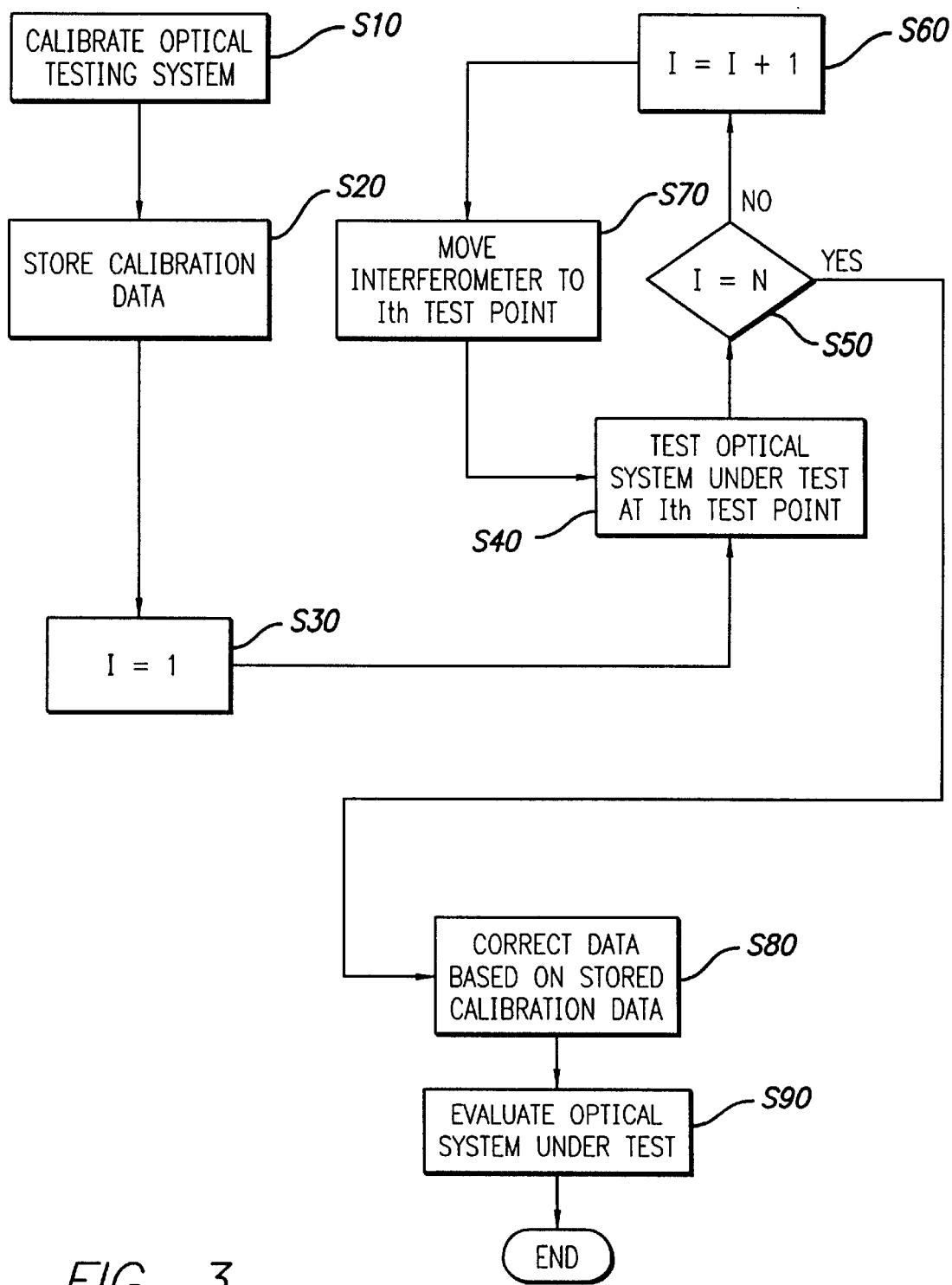
FIG. 3 is a flowchart delineating an exemplary method for operating the interferometric testing system illustrated in FIG. 1.

The operation of the interferometric testing system 100 employing a multiple plane reference mirror 110 according to the present invention will now be described with respect to FIG. 3, which illustrates a method for operating the interferometric testing system. During step S10, the interferometric testing system 100 is calibrated. Preferably, a calibration reference sphere is installed in place of the optical system under test 150 and the returned light is analyzed by the interferometer 110. The "calibration data" generated by the interferometer 110 during step S10 is stored in the computer 160 for later use during step S20.

After the interferometric testing system 100 has been calibrated, the system is initialized during step S30. In the exemplary case under discussion, the optical system under test 150 is installed in the interferometric testing system 100 and the first test point to be used in the first test run is selected. In the exemplary case under discussion, the on-axis beam is selected. During step S40, the optical system under test 150 is tested with respect to this image point and the data is stored in computer 120. It will be appreciated that in this exemplary case, the multiple plane reference mirror 110 will reflect the beam corresponding to the selected image point back onto itself.

A check is then performed to determine whether or not the last of the N image points in the prescribed test point sequence has been tested at step S50. When the answer is negative, the interferometric testing system 100 is reconfigured for the $I^{th}+1$ image point during step S60, i.e., the step labeled "I=I+1," and the interferometer 12 (and the hologram 112) is (are) positioned to the $I^{th}$ test point in the test point sequence during step S70. It will be noted that steps S60 and S70 can be performed in any order, including in parallel. Then, step S40 is repeated.

In the event that the determination at step S50 is affirmative, the data is corrected based on the calibration data stored in the computer 120 during step S80. Then, the performance of the optical system under test 150 is evaluated during step S90. The method then ends.

It will be appreciated that any number of methodologies for evaluating the optical system under test are known to one of ordinary skill in the art and all of these evaluation methods are considered to fall within the scope of the above-described method for operating the interferometric testing system 100. Moreover, it will be appreciated that the steps S10 and S20 need not be repeated for each optical system under test 150 that is being evaluated. So long as the calibration data stored in the computer 120 is not expected to vary, another optical system under test can be evaluated using steps S30–S90 alone.

Thus, a first preferred embodiment of the present invention is an interferometric testing system, which advantageously can be employed in evaluating an optical system under test. The interferometric testing system includes an interferometer that outputs a planar light beam, a substantially perfect lens, e.g., reference sphere, disposed between the interferometer and an image plane of the optical system under test, and a multiple plane reference mirror on the object side of the optical system under test. Preferably, the interferometer is controlled by a computer system. According to one aspect of the inventive interferometric testing system, each of the interferometer, the reference sphere and the multiple plane reference mirror are at fixed distances from one another with respect to the optical system under test, as illustrated in FIG. 1. Moreover, the interferometer and the optical system under test can be repositioned with respect to one another so that the optical system under test is evaluated at a plurality of test points. In an exemplary case, the combination of the interferometer and the reference sphere are moved with respect to the optical system under test such that the optical axis of the combination is parallel to the optical axis of the system under test and the image point generated by the hologram is displaced less than the radius of the image side of the optical system under test from the optical centerline of the optical system under test 150.

Thus, another preferred embodiment of the present invention is a method of interferometrically testing an optical system, the method including generating a light beam from an interferometer through a reference sphere generating an image point illuminating an optical system under test. The beam is reflected back toward the interferometer from said optical system and is then refocused by the reference sphere and applied to the interferometer 12, thus allowing the light traversing the optical system under test 150 to impinge on the interferometer. These steps are repeated for all of the test points in a predetermined sequence, with data being collected for each test point. It will be appreciated that the collected data advantageously can be employed to form a phase map and/or contour map of the optical system under test.

As discussed above, the multiple plane reference mirror produces only one return beam, i.e., the beam corresponding to the image point generated by the reference sphere, at any given time. Thus, there is no problem with respect to confusion at the interferometer.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A method of operating an interferometric testing system including a multiple plane reference mirror to thereby evaluate an optical system under test, the method comprising:

generating an image point at a selected one of N predetermined test points;

passing light corresponding to the image point from the image side of the optical system under test to the object side;

reflecting light corresponding to the image point from the object side of the optical system under test to the image side using a multiple plane reference mirror;

collecting data corresponding to the reflected light;

repeating the generating, passing, reflecting, and collecting steps for each of the N predetermined test points; and analyzing the collected data for all of the N predetermined test points.

2. The invention of claim 1 further comprising:

producing a spherical light beam; and wherein the generating step comprises the step of generating the image point at each of the N predetermined test points by applying the light beam to a reference sphere.

3. The invention of claim 1 wherein the interferometric testing system includes an interferometer, and wherein the analyzing step is performed using the interferometer.

4. The invention of claim 1 wherein the multiple plane reference mirror reflects each incoming incident beam back along the incident beam.

5. An interferometric testing system for testing an optical system, comprising:

an interferometer which outputs a light beam and analyzes a selected light beam;

a reference sphere which generates an image point in an image plane of the optical system responsive to the light beam; and a multiple plane reference mirror which reflects the light beam corresponding to the image point transmitted by the optical system back through the optical system to thereby generate the selected light beam, wherein:

the multiple plane reference mirror reflects the light beam back along the arrival path of the light beam irrespective of the separation between the image point and the centerline of the optical system.

6. The invention of claim 5 wherein the multiple plane reference mirror comprises a holographic multiple plane reference mirror.

7. An interferometric testing system for testing an optical system, comprising:

first means for outputting a light beam;

second means for analyzing a selected light beam;

third means for generating an image point in an image plane of the optical system responsive to the light beam; and fourth means including a multiple plane reference mirror for reflecting the light beam corresponding to the image point transmitted by the optical system back through the optical system to thereby generate the selected light beam, wherein:

the fourth means reflects the light beam back along the arrival path of the light beam irrespective of the separation between the image point and the centerline of the optical system.

8. The invention of claim 7 wherein the multiple plane reference mirror comprises a holographic multiple plane reference mirror.

* * * * *